(12) United States Patent
Gunnarsson et al.

(10) Patent No.: US 12,462,495 B2
(45) Date of Patent: Nov. 4, 2025

(54) SYSTEMS AND METHODS FOR LOCKING VIRTUAL ENVIRONMENTS IN MIXED REALITY

(71) Applicant: ARKIO EHF., Reykjavík (IS)

(72) Inventors: Hilmar Gunnarsson, Gardabaer (IS); Haraldur Darri Thorvaldsson, Reykjavik (IS)

(73) Assignee: ARKIO EHF., Reykjavík (IS)

( * ) Notice: Subject to any disclaimer, the term of this patent is extended or adjusted under 35 U.S.C. 154(b) by 174 days.

(21) Appl. No.: 18/377,485

(22) Filed: Oct. 6, 2023

(65) Prior Publication Data
US 2024/0119680 A1 Apr. 11, 2024

Related U.S. Application Data

(60) Provisional application No. 63/378,785, filed on Oct. 7, 2022.

(51) Int. Cl.
*G06T 19/00* (2011.01)
(52) U.S. Cl.
CPC .................. *G06T 19/006* (2013.01)
(58) Field of Classification Search
CPC ..... G06T 19/006; G06F 3/012; G06F 3/0346; G06F 3/03547; G06F 3/04815; G06F 3/011
See application file for complete search history.

(56) References Cited

U.S. PATENT DOCUMENTS

| 2019/0065027 A1* | 2/2019 | Hauenstein | G06F 3/0484 |
| 2022/0207837 A1* | 6/2022 | Lee | G06F 3/011 |

FOREIGN PATENT DOCUMENTS

WO  WO-2022046367 A1 *  3/2022 ............ G06F 3/017

* cited by examiner

*Primary Examiner* — Jeffery A Brier
(74) *Attorney, Agent, or Firm* — Lando & Anastasi, LLP

(57) ABSTRACT

Examples of the disclosure include a method for providing a simulated environment including displaying, at a human-scale point-of-view, at least a first portion of a simulated environment to a user in a first location; receiving one or more user inputs to transition to a large-scale point-of-view; storing a position and orientation of the user at the first location; displaying, at the large-scale point-of-view, at least a second portion of the simulated environment to the user; receiving at least one user input to transition back to the human-scale point-of-view; displaying, at the human-scale point-of-view responsive to receiving the user input, the at least the first portion of the simulated environment to the user at the first location; and locking the position and orientation of the user at the first location responsive to displaying the at least the first portion of the simulated environment to the user at the first location.

17 Claims, 12 Drawing Sheets

SYSTEMS AND METHODS FOR LOCKING VIRTUAL ENVIRONMENTS IN MIXED REALITY

CROSS-REFERENCE TO RELATED APPLICATIONS

This application claims priority under 35 U.S.C. § 119(e) to U.S. Provisional Application Ser. No. 63/378,785, titled "SYSTEMS AND METHODS FOR LOCKING VIRTUAL ENVIRONMENTS IN MIXED REALITY," filed on Oct. 7, 2022, which is hereby incorporated by reference in its entirety.

BACKGROUND

1. Field of the Disclosure

At least one example in accordance with the present disclosure relates generally to virtual-, mixed-, and/or augmented-reality environments.

2. Discussion of Related Art

Virtual reality (VR) and augmented reality (AR) are increasingly becoming an area of technical interest for many industries. VR generally refers to the exposure of a user to purely computer-generated stimuli, including visual stimuli. In contrast, AR generally refers to the exposure of a user to a combination of real and computer-generated stimuli. Mixed reality (MR) generally refers to the merging of a physical, real-world environment and a computer-generated environment, and may encompass VR and AR. VR, AR, and MR systems are particularly popular in the entertainment industry.

SUMMARY

According to at least one aspect of the present disclosure, a non-transitory computer-readable medium storing thereon sequences of computer-executable instructions for providing a simulated environment is provided, the sequences of computer-executable instructions including instructions that instruct at least one processor to display, at a human-scale point-of-view, at least a first portion of a simulated environment to a user in a first location, receive, from the user, one or more user inputs to transition to a large-scale point-of-view, lock, responsive to receiving the one or more user inputs, a position of the user at the first location, and display, at the large-scale point-of-view responsive to receiving the one or more user inputs, at least a second portion of the simulated environment to the user.

According to at least one example, a non-transitory computer-readable medium storing thereon sequences of computer-executable instructions for providing a simulated environment is provided, the sequences of computer-executable instructions including instructions that instruct at least one processor to: display, at a human-scale point-of-view, at least a first portion of a simulated environment to a user in a first location; receive, from the user, one or more user inputs to transition to a large-scale point-of-view; store, responsive to receiving the one or more user inputs, a position and orientation of the user at the first location; display, at the large-scale point-of-view responsive to receiving the one or more user inputs, at least a second portion of the simulated environment to the user; receive, from the user, at least one user input to transition back to the human-scale point-of-view; display, at the human-scale point-of-view responsive to receiving the at least one user input, the at least the first portion of the simulated environment to the user at the first location; and lock the position and orientation of the user at the first location responsive to displaying the at least the first portion of the simulated environment to the user at the first location.

In at least one example, the instructions further instruct the at least one processor to: display a passthrough feed of a physical environment to the user responsive to one or more passthrough criteria being met. In at least one example, the passthrough criteria include a speed of the user exceeding a threshold speed. In at least one example, the passthrough criteria include a distance between the user and a starting position being exceeded. In at least one example, the starting position is a position at which the user was most recently stationary. In at least one example, the passthrough criteria further include a speed of the user exceeding a threshold speed.

In at least one example, the instructions further instruct the at least one processor to: generate, for a physical space, at least one anchor grid including one or more spatial anchors. In at least one example, the instructions further instruct the at least one processor to: add, as the user moves around the physical space, additional spatial anchors to the at least one anchor grid. In at least one example, storing the position and the orientation of the user at the first location includes storing an indication of the position and the orientation of the user relative to at least one spatial anchor closest to the first location. In at least one example, the instructions further instruct the at least one processor to: define the one or more spatial anchors relative to the physical space, the one or more spatial anchors being independent of the simulated environment.

According to at least one example, a method for providing a simulated environment is provided, the method comprising: displaying, at a human-scale point-of-view, at least a first portion of a simulated environment to a user in a first location; receiving, from the user, one or more user inputs to transition to a large-scale point-of-view; storing, responsive to receiving the one or more user inputs, a position and orientation of the user at the first location; displaying, at the large-scale point-of-view responsive to receiving the one or more user inputs, at least a second portion of the simulated environment to the user; receiving, from the user, at least one user input to transition back to the human-scale point-of-view; displaying, at the human-scale point-of-view responsive to receiving the at least one user input, the at least the first portion of the simulated environment to the user at the first location; and locking the position and orientation of the user at the first location responsive to displaying the at least the first portion of the simulated environment to the user at the first location.

In at least one example, the method includes displaying a passthrough feed of a physical environment to the user responsive to one or more passthrough criteria being met. In at least one example, the passthrough criteria include a speed of the user exceeding a threshold speed. In at least one example, the passthrough criteria include a distance between the user and a starting position being exceeded. In at least one example, the starting position is a position at which the user was most recently stationary. In at least one example, the passthrough criteria further include a speed of the user exceeding a threshold speed.

In at least one example, the method includes generating, for a physical space, at least one anchor grid including one or more spatial anchors. In at least one example, the method includes adding, as the user moves around the physical space, additional spatial anchors to the at least one anchor grid. In at least one example, storing the position and the orientation of the user at the first location includes storing an indication of the position and the orientation of the user relative to at least one spatial anchor closest to the first location. In at least one example, the method includes defining the one or more spatial anchors relative to the physical space, the one or more spatial anchors being independent of the simulated environment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, VR and AR environments (collectively, "simulated environments") are increasingly becoming an area of technical interest for many industries, such as architectural modeling and interior design. VR or AR may be used to visualize design concepts within a physical environment. VR or AR may be used to present the physical environment while enabling a user to simulate virtual changes to the environment. For example, VR or AR may be used to display a physical room to a user while enabling the user to position simulated assets, such as virtual furniture, within the physical room. MR may include VR and/or AR. MR environments may broadly include any environments in which at least some computer-generated stimuli are provided that affect a user's perception of reality.

Figure 1:
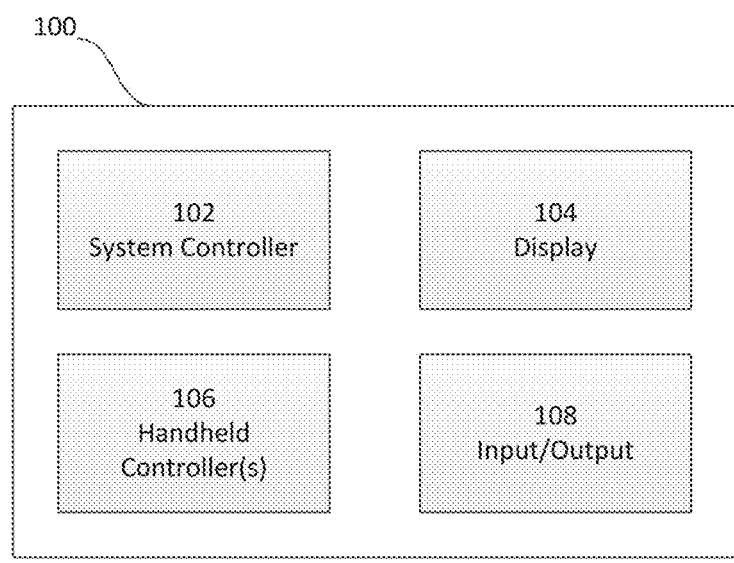
FIG. 1 illustrates a block diagram of a modeling system according to an example.

Users may interface with VR, AR, and/or MR environments using a modeling system. FIG. 1 illustrates a modeling system 100 according to one embodiment of the disclosure. The modeling system 100 includes a system controller 102, a display 104, a handheld controller 106, and an input/output module 108. In some embodiments, the system controller 102 may include the input/output module 108.

The system controller 102 is generally configured to generate a simulated environment and manage interactions between a user and the simulated environment. The simulated environment refers generally to either a VR, AR, or MR environment. For example, the processor 102 may generate a simulated environment, display the simulated environment on the display 104, and modify the simulated environment according to input signals received from the handheld controller 106. The system controller 102 may include or be coupled to storage and/or memory to store information used to generate, display, modify, and memorialize the simulated environment, and may include one or more processors coupled to the storage and/or memory to execute any actions or functioned discussed herein as being performed by the modeling system 100. The storage and/or memory may alternatively be referred to as one or more non-transitory computer-readable media configured to store instructions that, when executed by the one or more processors, causes the one or more processors to perform any of the functions discussed herein as being executed by the modeling system 100 and/or a VR, AR, or MR device.

The display 104 is generally configured to display a simulated environment. For example, the display may receive input signals from the system controller 102 to display the simulated environment generated by the system controller 102. The display 104 is discussed in greater detail below with respect to FIGS. 2, 3A, and 3B.

The handheld controller 106 is generally configured to allow a user to interact with a simulated environment. For example, the handheld controller 106 may be configured to interact with the simulated environment generated by the system controller 102. In some embodiments, the modeling system 100 may include one or more controllers in addition to the handheld controller 106, as discussed in greater detail below. The handheld controller 106 is discussed in greater detail below with respect to FIGS. 4, 5A, and 5B. In other embodiments, no controllers may be necessary. For example, user input may be managed by tracking the user's hands directly with cameras, sensors, or a combination of both. Accordingly, the handheld controller 106 may be omitted in some examples.

The input/output module 108 is configured to interact with systems external to the modeling system 100. For example, the input/output module 108 may be configured to exchange information with a 2D display to display a 2D view of the simulated environment. In another example, the input/output module 108 may be configured to exchange information with an external model generator. For example, the input/output module 108 may be configured to provide model information to a 3D printer, which may print a 3D model of one or more models within a simulated environment generated by the modeling system 100. As discussed above, the system controller 102 may include the input/output module 108.

Figure 2:
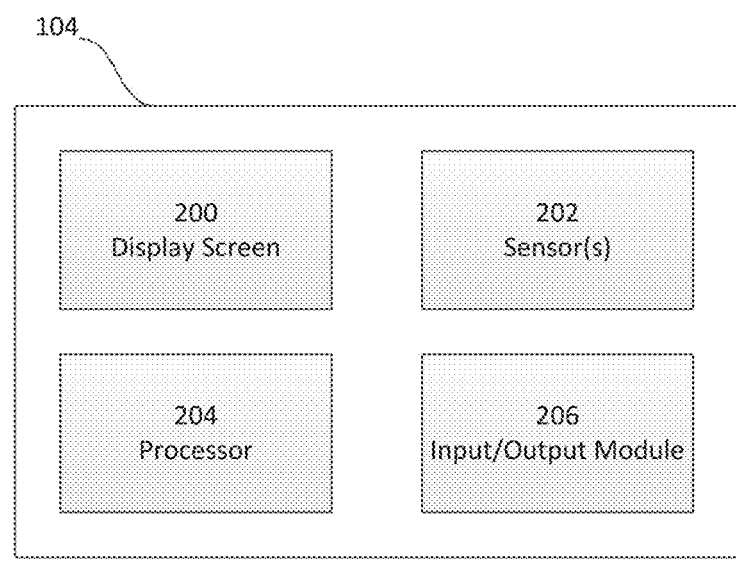
FIG. 2 illustrates a block diagram of a display according to an example.

FIG. 2 illustrates a block diagram of the display 104 according to an embodiment. The display 104 includes a display screen 200, one or more sensors 202, a processor 204, and an input/output module 206. As discussed above, in one embodiment the display 104 is configured to be worn on a user's head or face to provide visual stimuli indicative of a simulated environment.

The display screen 200 is generally configured to display a simulated environment to a user. The display screen 200 may cover a user's entire field-of-view (FOV), or a significant portion thereof, to provide a feeling of immersion within the simulated environment to the user. The display screen 200 may be configured to display images at an appropriate framerate according to signals received from the processor 204. In some cases, two separate display screens may be used instead of one.

For example, in one example, the framerate of the display 104 is selected to prevent a user from experiencing adverse effects (for example, dizziness) occasionally associated with simulated environments operating below an appropriate framerate. In one embodiment, the framerate is maintained at approximately 90 frames-per-second (FPS) to provide a comfortable experience for a user. In alternate embodiments, the processor 204 may dynamically determine an appropriate framerate.

The one or more sensors 202 are generally configured to sense parameters associated with the display 104. For example, the one or more sensors 202 may include an accelerometer configured to sense an orientation of the display 104, and generate feedback signals indicative of the orientation of the display 104. The signals indicative of the orientation of the display 104 may affect the user's experience in one of several ways. For example, in one embodiment, the feedback signals may allow the user to "look around" the simulated environment by altering a user's point-of-view (POV) within the simulated environment analogously to the orientation of the user's head.

The processor 204 is generally configured to process signals affecting the simulated environment. For example, the processor 204 may receive the feedback signals from the one or more sensors 202 to determine an orientation and/or position of the user's head, and correspondingly alter the display on the display screen 200. Alternatively, the processor 204 may communicate the feedback signals to the system controller 102, and receive input signals from the system controller 102 to alter the display on the display screen 200.

In some embodiments, the processor 204 may be internal to the display 104 and manage the simulated environment independently, or may consist of multiple processors operating in parallel. In other embodiments, the processor 204 may be internal to the display 104 and communicate with one or more additional processing elements external to the display 104 via the input/output module 206. For example, the display 104 may be coupled to one or more external processors via a wired "tether" via the input/output module 206, or via a "tetherless" wireless connection via the input/output module 206. In still other embodiments, the display 204 may not include the processor 204 and may be controlled by one or more external processors via the input/output module 206.

Figure 3A:
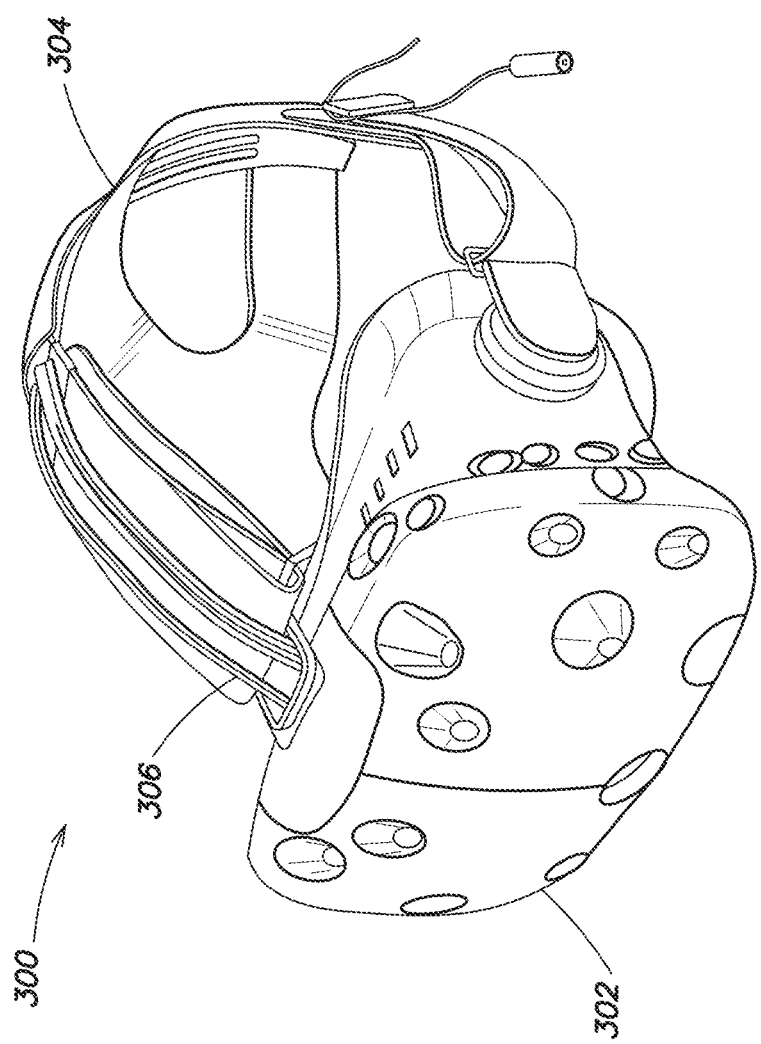
FIG. 3A illustrates a perspective view of a display headset according to an example.
Figure 3B:
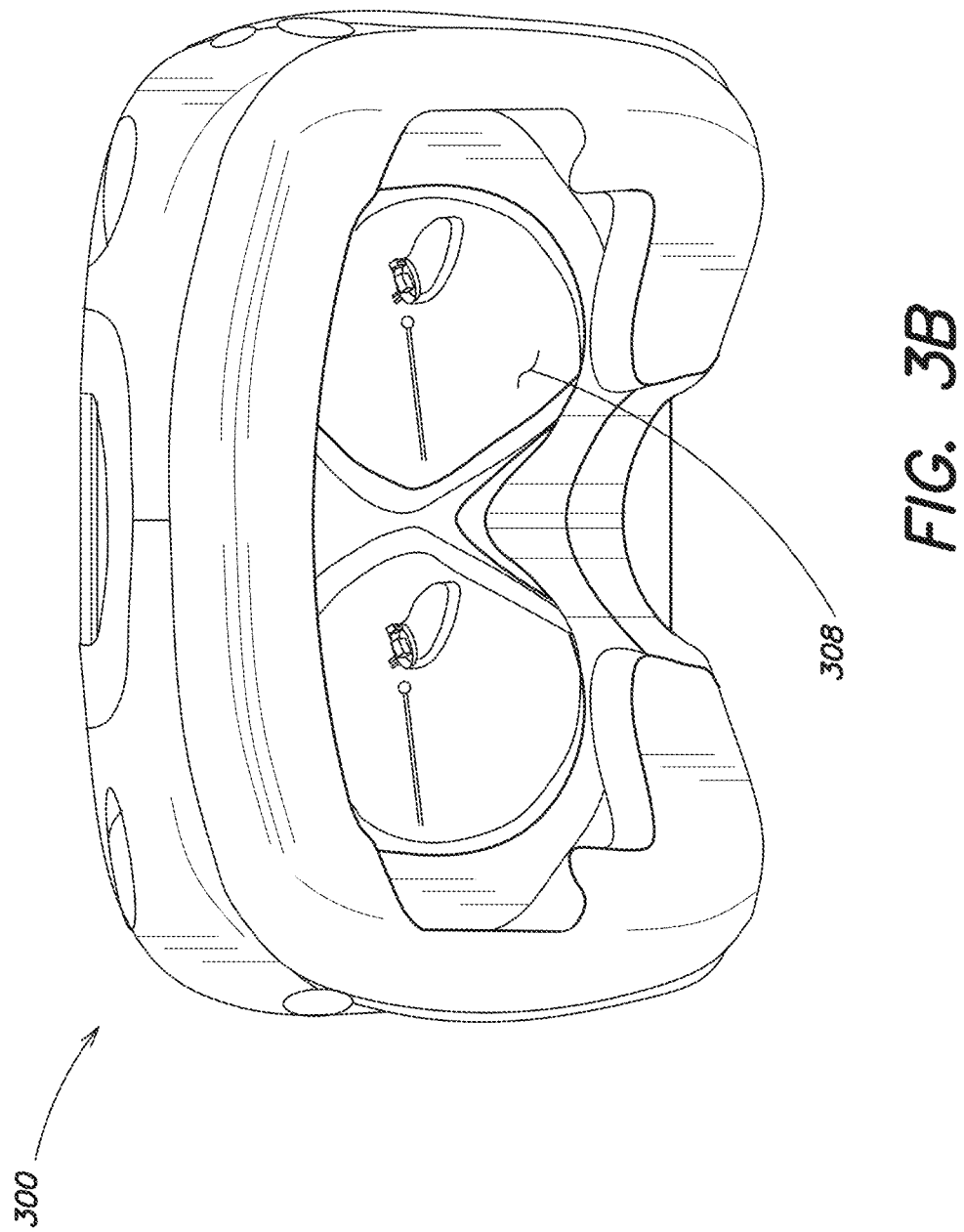
FIG. 3B illustrates a back view of the display headset according to an example.

FIG. 3A illustrates a perspective view of a headset display 300, which is an example embodiment of the display 104. The headset display 300 may be, or may be similar to, the HTC Vive™ headset developed by HTC Corporation of New Taipei City, Taiwan, and Valve Corporation of Bellevue, Washington. The headset display 300 includes a main body portion 302 including a plurality of components (for example, one or more sensors, a display screen, and so forth), a harness portion 304 to secure the headset display 300 to a user's head, and a wired tether portion 306 to connect the headset display 300 to one or more external systems. In other instances, a headset may be a fully stand-alone device, requiring no connection to any external computing device. FIG. 3B illustrates a back view of the headset display 300. The headset display 300 includes a display screen 308 to display a simulated environment to a user.

Figure 4:
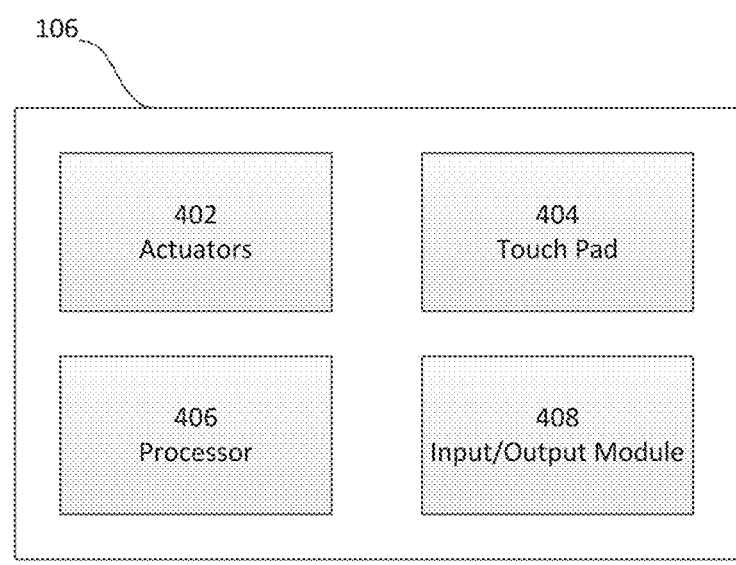
FIG. 4 illustrates a block diagram of a handheld controller according to an example.

FIG. 4 illustrates a block diagram of one example of the handheld controller 106. The handheld controller 106 includes actuators 402, a touch pad 404, a processor 406, and an input/output module 408. As discussed above, the handheld controller 106 may be configured to allow a user to interface with a simulated environment. In some embodiments, the touch pad 404 may be replaced by one or more other input mechanisms. In still other embodiments, hand gestures may be sensed and translated into computer-readable signals used for interaction with a simulated environment instead of, or in addition to, a physical controller.

In one embodiment, the actuators 402 include one or more push-buttons and one or more trigger actuators. Actuation of one of the actuators 402 generates an output signal which may affect the simulated environment. For example, in one embodiment, actuation of one of the actuators 402 may display a menu of options on the display screen 200 which the user may select, as discussed in greater detail below.

The touch pad 404 may include a touch-sensitive surface configured to allow a user to "move" within the simulated environment or to interact with the simulated environment. The touch pad 404 may detect, for example, a position of a user's touch on the touch pad 404 and generate feedback signals indicative of the position of the user's touch. The feedback signals indicative of the position of the user's touch on the touch pad 404 may affect the user's experience in one of several ways. For example, in one embodiment, the feedback signals may allow the user to "move around" the simulated environment by altering a user's position within the simulated environment analogously to the user's touch on the touch pad 404. In alternate embodiments, the touch pad 404 may be replaced with a joystick or similar component. The processor 406 is generally configured to process signals affecting the simulated environment. For example, the processor 406 may receive the feedback signals from the actuators 402 to determine whether a menu button has been actuated, and correspondingly generate output signals to cause a menu to be displayed on the display screen 200. For example, the processor 406 may communicate the display signals to the display 104 via the input/output module 408 or to one or more external processors. Alternatively, the processor 406 may communicate the output signals to the system controller 102, and the system controller 102 may communicate display signals to the display 104.

Figure 5A:
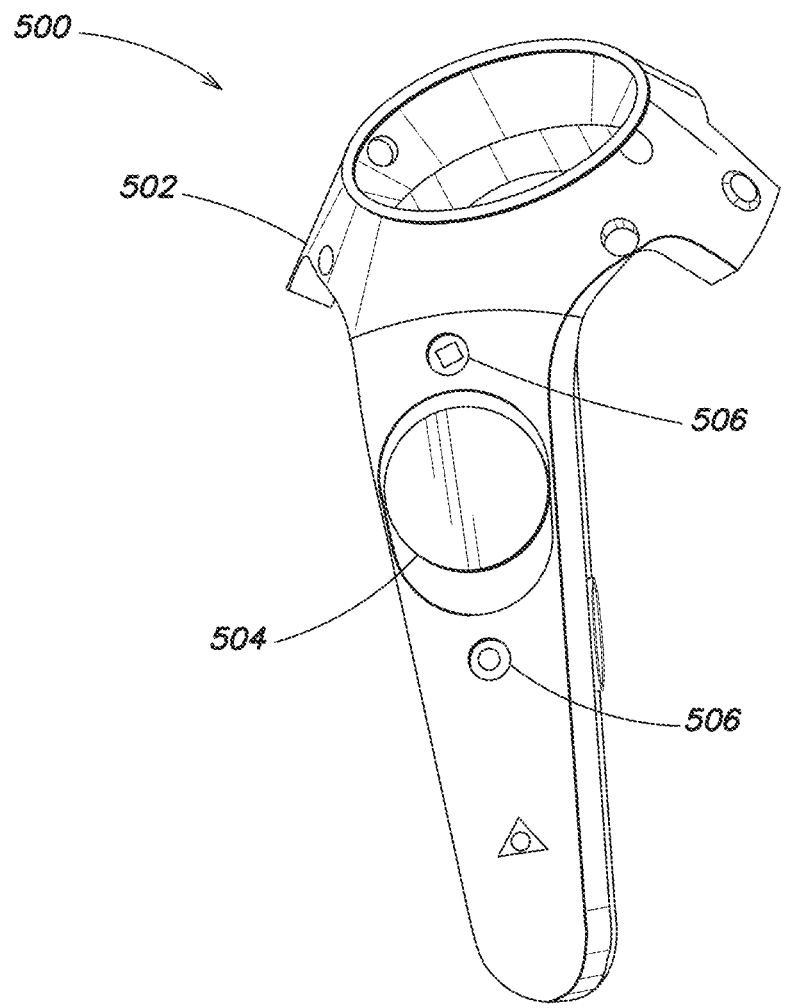
FIG. 5A illustrates a perspective view of a controller according to an example.
Figure 5B:
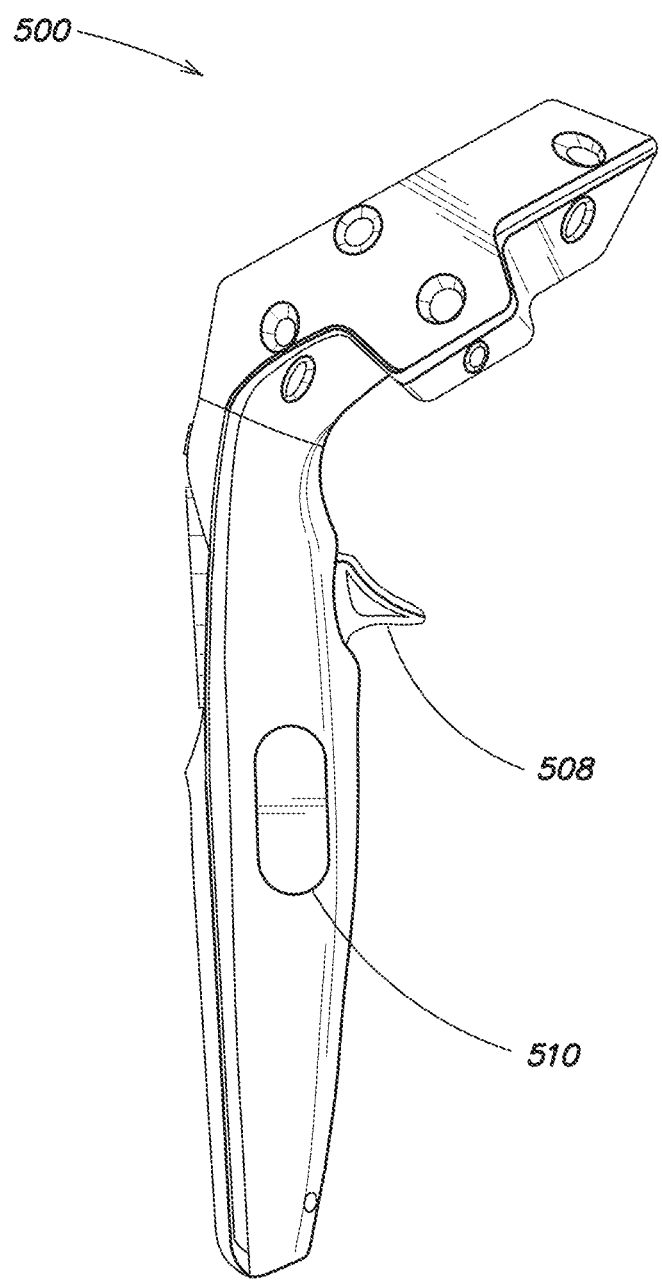
FIG. 5B illustrates a side view of the controller according to an example.

FIG. 5A illustrates a perspective view of a controller 500, which is an example of the handheld controller 106. The controller 500 may be, or may be similar to, the HTC Vive™ controller developed by HTC Corporation of New Taipei City, Taiwan, and Valve Corporation of Bellevue, Washington. The controller 500 includes a main body portion 502 configured to house components of the controller 500 (for example, one or more sensors), a touch pad 504, and button actuators 506. FIG. 5B illustrates a side view of the controller 500. The controller 500 includes a trigger actuator 508, and a grip actuator 510 to detect whether a user is grasping the controller 500. In at least one embodiment, the display 104 and the handheld controller 106 enable a user to interface with a simulated environment with either three degrees of freedom (3DOF) or six degrees of freedom (6DOF).

Figure 6:
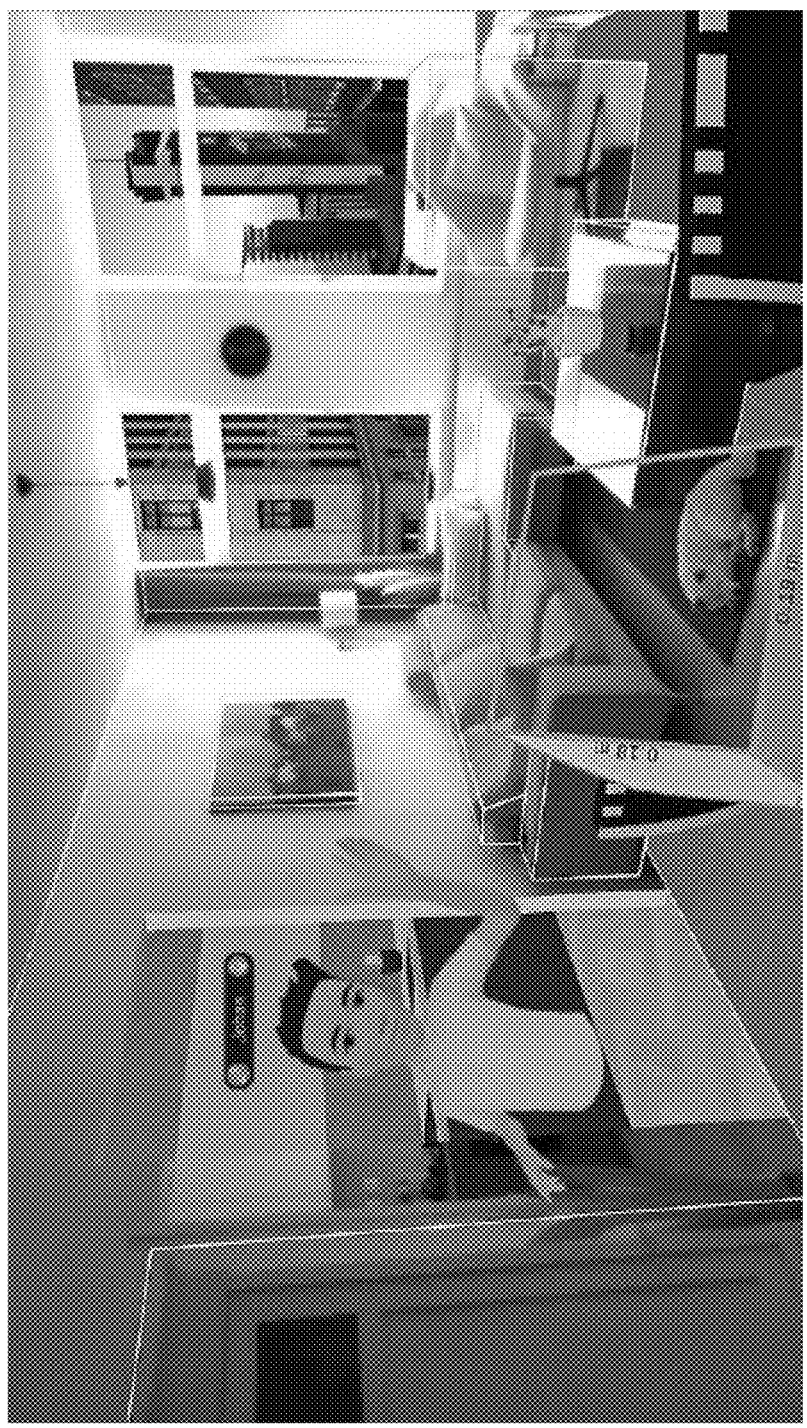
FIG. 6 illustrates a first point-of-view of a simulated environment according to an example.

As discussed above, the system controller 102 is generally configured to interface with the display 104, the handheld controller 106, and the input/output module 108 to generate a simulated environment and manage interactions between a user and the simulated environment. Users may view simulated environments through one of several different perspectives. For example, a user may have a perspective that mimics a normal first-person POV, also referred to as a "human scale." For example, FIG. 6 illustrates a simulated environment 600 at a human scale according to an example. As illustrated in FIG. 6, a user may be presented with a simulated environment roughly from the perspective a human scale.

Figure 7:
FIG. 7 illustrates a second point-of-view of a simulated environment according to an example.

A user may also zoom out to a larger overhead perspective to view the simulated environment from an elevated perspective. FIG. 7 illustrates a simulated environment 700 at a large scale (also referred to as an "overheard scale," "God scale," "bird's-eye scale," and so forth) according to an example. As illustrated in FIG. 7, a virtual worktable 702 provides a simulated environment that a user may look down at from a bird's-eye view. The virtual worktable 702 may include the simulated environment 600 that the user is viewing at a human scale in FIG. 6. Though FIG. 7 also includes elements of a human-scale view because the user views the simulated environment 700 around the virtual worktable 702 at a human scale, FIG. 7 is considered to provide a large-scale view because the virtual worktable 702 is presented at a small scale relative to the user. Users may be able to switch back and forth between different perspectives (for example, the simulated environment 600 of FIG. 6 and the simulated environment 700 of FIG. 7) as the user works in the simulated environment.

In various examples, a simulated environment may include a virtual controller representing the physical handheld controller 106. For example, the simulated environment 702 includes a virtual controller 704. When a user moves the handheld controller 106, the virtual controller 704 will move in an analogous manner. Accordingly, although reference may be made to movement of either a handheld controller (for example, the handheld controller 106) or a virtual controller (for example, the virtual controller 704), it is to be appreciated that the movement of the virtual controller 704 tracks the movement of the handheld controller 106. Accordingly, reference to the movement of a controller may refer to movement of either a physical or virtual controller.

Examples of the disclosure facilitate switching between perspectives in simulated environments. In various examples, a simulated environment may be aligned with a physical environment that a user is physically located in within the real world. For example, as illustrated in FIG. 6, simulated-environment elements are overlaid with physical elements in the physical world. After a user zooms out to a larger scale (for example, as illustrated in FIG. 7), examples of the disclosure enable the user to easily revert back into a human-scale perspective at a location corresponding to the user's physical location in the physical space. For example, while working in the simulated environment 600 at a human scale as illustrated in FIG. 6, the user may transition to a large-scale view as illustrated in FIG. 7. The user's position in the simulated environment 600 on the virtual worktable 702 may be locked and visible to the user from the large-scale view of FIG. 7. When the user is ready to revert back to the human-scale view of FIG. 6, the user may do so to snap back to the user's locked position and resume working within the human-scale simulated environment 600. As discussed below, spatial anchors may be used to avoid complications when working in passthrough mode, where users can accidentally pan or rotate a simulated environment. Example spatial anchors lock the user to a simulated environment and prevent accidental misalignment.

VR, AR, and/or MR user devices present a simulated environment to a user. Although the principles of the disclosure are applicable to AR, VR, and MR devices, the disclosure may refer to these devices collectively as "VR devices" hereafter simply for purposes of brevity, rather than to suggest that the principles of the disclosure are inapplicable to AR and MR devices. The modeling system 100 may provide an example of a VR device.

As discussed above, VR devices may include headset devices having display screens (for example, the display screen 200) configured to provide visual stimuli to a user. The sensors 202 may include sensors, such as accelerometers, to track movement of the user's head as the user looks around a simulated environment. The modeling system 100 may be configured to maintain a coordinate system (indicating position and orientation, for example) for a physical environment (or "real space") as well as a coordinate system for a simulated environment (or "model space").

The handheld controller 106 may enable a user to create simulated assets, or "models," which exist within the model space. Although certain examples may be provided below with respect to handheld controllers (for example, referring to activating a grip button on a handheld controller), the disclosure is applicable to any of a wide variety of user-input devices which may or may not include handheld controllers. For example, a user-input device may include a motion-capture device that captures a user's motions and/or gestures and identifies a user-input command corresponding to an identified motion and/or gesture. Accordingly, no limitation is implied by references to examples in which a physical handheld controller is implemented. Where reference is made to the handheld controller 106, it is to be appreciated that such references may also refer to a non-handheld-controller-based input system. For example, if reference is made to the handheld controller 106 enabling a feature to be executed, such a reference may also refer to a hand-motion-tracking capability enabling the feature to be executed.

The modeling system 100 may implement spatial anchors to associate a real space with a model space. Spatial anchors may be used to map the real space to the model space such that the physical position and orientation of models in the model space may be mapped to the real space. These spatial anchors enable simulated models to maintain their position and orientation relative to the physical environment. Spatial anchors may be stored on-device with permanent GUIDs that can be queried by device applications, enabling the applications to reestablish physical spatial coordinates with anchors created in earlier sessions. For example, the spatial anchors may be stored in storage and/or memory in the modeling system 100 (not explicitly illustrated). In some examples, GUIDs may be or include a long (for example, 128-bit), randomly generated identifier that is probabilistically likely to be unique and can thus be used as a globally unique identified (or "GUID").

The modeling system 100 may deposit a grid of spatial anchors around spatially-anchored physical locations traversed by a user. Rather than directly mapping objects in the physical and model spaces, the spatial anchors may anchor the real space to the model space. In one example, a spatial anchor may be associated with a cell, which may include a void or bound. A cell that is associated with one or more spatial anchors (for example, through a binding attribute node) may be referred to as an "AR cell." Global anchors may be supported by associating them with the model space's fixed top cell, that is, making the top cell an AR cell.

Figure 8:
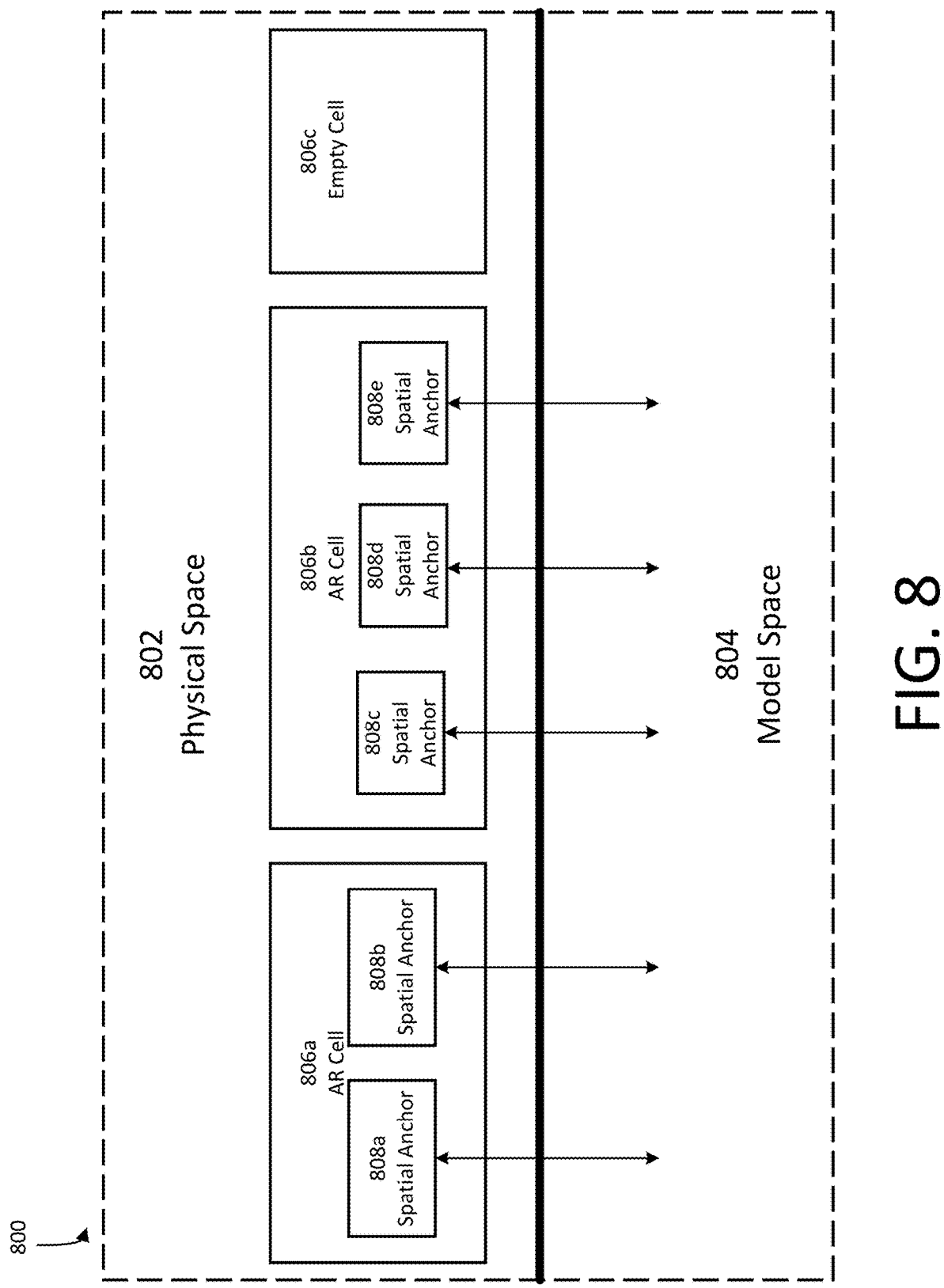
FIG. 8 illustrates a block diagram showing a mapping between a physical space and a model space according to an example.

To illustrate the foregoing, FIG. 8 illustrates a block diagram 800 showing a mapping between a physical space 802, such as a user's home, and a model space 804, which may include the virtual environment in which simulated models, such as computer-generated simulations of furniture, reside.

The physical space 802 includes a first AR cell 806a, a second AR cell 806b, and an empty cell 806c. Each of the cells 806a-806c may be associated with a different physical area in some examples (or, as discussed below, may be associated with the same physical area). For example, each of the cells 806a-806c may be associated with a different room in the user's house. The first AR cell 806a is associated with a first anchoring grid including first spatial anchor 808a and a second spatial anchor 808b, which are associated with specific physical locations in the physical space 802. The spatial anchors 808a, 808b may refer to physical locations in the physical room associated with the first AR cell 806a, thus why the spatial anchors 808a, 808b are tied to the first AR cell 806a.

Similarly, the second AR cell 806b is associated with a second anchoring grid including a third spatial anchor 808c, a fourth spatial anchor 808d, and a fifth spatial anchor 808e. Each of the spatial anchors 808c-e may be associated with physical locations in a different physical room than the spatial anchors 808a-808b, thus why the spatial anchors 808c-808e are associated with the second AR cell 806b. Conversely, the empty cell 806c is not associated with any spatial anchors. The empty cell 806c may thus be associated with a physical room that has not yet been populated with any spatial anchors. The empty cell 806c may not be considered an AR cell because the empty cell 806c is not associated with any spatial anchors. In some examples, the empty cell 806c is provided only for purposes of explanation and may not represent an actual cell or any actual information stored by the modeling system 100; that is, rather than an empty cell, there may simply be the absence of an AR cell.

The modeling system 100 enables the mapping between the modeling system's 100 current model space and the current physical location the modeling system 100 resides in, in order to be able to map points in a virtual model back and forth to points in the physical space. That is, each of the spatial anchors 808a-808e is anchored to a physical location in the physical space 802, and models in the model space 804 are, in turn, mapped to spatial anchors. The spatial anchors 808a-808e may therefore be considered tied to the physical space 802 but independent of the model space 804, or models therein, because the spatial anchors 808a-808e are bound to physical locations in the physical space 802 which are not dependent on the location of models in the model space 804. Examples therefore store spatial anchors at the level of the modeling system 100 itself, separately from any particular model. Instead of creating new anchors for every model, the device only needs to build an anchoring grid for each physical location in which the device is used. The AR cells in models then refer to this (essentially permanent) grid, or group, of device spatial anchors.

A physical space may be identified by a random ID generated by the modeling system 100 as the modeling system 100 starts up in or enters a physical location for the first time, or after the earlier virtual boundaries for that space have been deleted or lost. Virtual boundaries may refer to boundaries created in a virtual environment that reflect boundaries in a real-world space. For example, when the modeling system 100 is first used by a user, the modeling system 100 may request that the user draw a line around the user's play area bounded by physical walls or other obstacles. This creates a virtual boundary (or "guardian system") such that, when the user approaches the virtual boundary, the modeling system 100 may warn the user that the user is approaching a physical obstacle in the physical space. As discussed in greater detail below, guardian systems may be implemented in some examples, but may be omitted in favor of different systems in other examples.

When the modeling system 100 starts up, enters a physical location for the first time, or after the earlier virtual boundaries for that space has been deleted or lost, the modeling system 100 may begin by querying an entities API on the modeling system 100 for all spatial anchors that the modeling system 100 has created in any physical location, which may be tied to a particular AR cell. The expectation is to either find nothing (for example, an empty cell), which may denote a new or forgotten physical location, or else a group of spatial anchors (for example, in an AR cell) that were laid down in a grid pattern in some earlier session in that same physical location, though not necessarily in that same model.

In the first case, a new physical ID is created and the first spatial anchor of a new grid is created and linked to that new physical ID. In the latter case, the physical ID of the grid is set as the current physical space. In either case, the grid-maintenance logic kicks in and is ready to add new spatial anchors to the grid as needed for it to keep covering the physical space as a user moves around the space.

In various examples, there may be a one-to-one mapping between anchor grids and physical spaces while there are many-to-many relations between physical spaces, AR cells, and models. A model may have multiple AR cells either linked to the same physical space (for example, multiple AR versions of the same physical location) or different physical spaces (for example, AR cells linked to different rooms in an apartment). A single AR cell may be bound to multiple physical spaces, such as a model that is being viewed in a meeting where multiple participants have mapped the model to their respective physical tables or areas.

Each spatial anchor may be linked to a physical space ID. All the spatial anchors linked to that physical space ID comprise the anchor grid of the physical space. In some examples, grids and physical IDs are initially local to the modeling system 100 since the spatial anchors making up each grid are local anchors. If shared spatial anchors (that is, spatial anchors shared by multiple individuals each having a respective modeling system) are introduced, the physical spaces may be linked by determining the physical spaces' locations relative to one another through a shared spatial anchor.

A user may operate in one of at least two states, including a VR state and a new AR state. In the AR state, the device may establish and/or maintain a spatial correspondence with the physical location the user inhabits by querying for existing spatial anchors. An AR state may be entered and exited automatically when a user's viewpoint via the VR device enters or leaves an AR cell that is bound to the user's current physical space, also referred to as the user "locking into" the cell or binding. A "binding" provides an association between an AR cell and a physical space ID in real, physical space. The binding may also store the position and/or orientation of a physical space's origin spatial anchor in the AR cell's space. In the AR state, a user's grip-button navigation may be disabled to ensure that the model and physical world line up. In order for the user to move a viewpoint in the AR state, the user may need to move around their physical head and body.

In some examples, the modeling system 100 may also have a passthrough toggle which may be available and orthogonal to AR and/or VR states. When turned on, the skybox of the simulated environment may be rendered with the passthrough feed instead of a sky. Further, in human scale the virtual worktable 702 may also be rendered with passthrough color (and, in other examples, additional and/or different objects other than the virtual worktable 702 may be rendered with the passthrough color). In some examples, toggling passthrough on when standing on a relatively empty table gives the impression of being in a "pure" AR mode as the virtual model effectively disappears, being replaced with the passthrough feed. This enables users to readily draw cells that appear to be embedded in the real, passthrough world in various examples.

AR cells may be defined by and bound to a physical space ID through a physical space binding attribute node. A physical space binding attribute node may have one or more of: the physical space ID to which the cell is being bound; a pose (that is, a position and rotation) in the cell's moored, cell-relative coordinate system that may be matched to the physical space's first spatial anchor pose (termed the physical space's "origin anchor"), which may enable the physical space and/or virtual model space coordinate-system correspondences to be established and defined; a scale, which is the user scale at which the binding was created and that the user's viewpoint must have for the physical and/or virtual mapping to match; and an alignment, expressed functionally as enum{Default, Locked, Unlocked}, which allows the setting of permanent alignment in a binding, as explained below.

In some examples, any subset of a cell's faces may be passthrough-colored by associating the faces with the binding node, using the same attribute scope scheme as the one used for a simple material node property. The AR cell itself may be associated with the binding node by using the "whole cell" coding from that scheme. This may enable AR cells to be told apart from merely AR painted cell faces.

In various examples, to lock into an AR cell the user may need to be close enough to the binding pose's location, as discussed in greater detail below. In some examples, the user may also need to be at approximately the same user scale as that in the binding, for example, within 10-20% of the scale in the binding. The user's user scale may be snapped to the AR cell's precise scale as the AR state is entered. This snapping enables having multiple bindings in the same cell (for example, the top cell) since only those close enough to the user in position and scale are locked into.

In some examples, AR state may have several effects on the behavior of the modeling system 100, which may have the effect of locking the user to an AR cell. Upon entering an AR state and/or locking in, the user may be teleported to the location in the AR cell corresponding to the user's current physical location. This may enable the AR passthrough view of reality to match virtual model geometry. While a user is locked into an AR cell, user virtual locomotion (for example, panning, rotating, and/or scaling) may be disabled, as any such motion may disrupt the alignment of the physical space and model space.

For example, while the user is viewing the virtual tabletop 702 as illustrated in FIG. 7, the virtual tabletop 702 may include one or more indications of one or more respective positions in the simulated environment 600 that the user can teleport to. Such indications may include, for example, visual indicators of positions on the virtual tabletop 702. If the user selects one of these indicators, the user may be teleported to that location. In particular, as discussed above, the user may be teleported to the location in the AR cell corresponding to the user's current physical location. Once locked into the AR cell, locomotion may be disabled as indicated above. In some examples, the user may be able to disable the lock and may then scale, pan, and/or zoom from the locked position and orientation. However, the modeling system 100 may store an indication of the position and/or orientation of the original alignment in the original locked position, and the user may teleport back to the original alignment position when the user is ready to re-enter the locked position.

In various examples in the locked state, teleporting may have different functionality depending on a direction in which the user teleports. For example, teleporting up may work the same as before and may in most cases disengage from the current AR cell and, unless the top cell is also bound to the current physical space, leave AR state altogether. Teleporting sideways may teleport out of the current AR cell to the user's last VR state location (or, in some examples, some destination point outside the AR cell), entering VR state. In various examples of the locked state, choosing a viewpoint may act as a teleportation operation, generally exiting and/or unlocking the current binding. Scaling may be similarly disabled except for certain large, aggressive, and/or long-press operations which do take effect and exit AR state. Teleporting into an AR cell bound to the current physical space may also alter the teleporter's behavior inasmuch as, in some examples, the teleporter's end point may lock onto the AR cell at the point corresponding to the user's current physical location. Also, some indication that the AR state will be entered may be shown.

In various examples, AR state enables passthrough-rendering of cell faces that have been "painted" with the binding. This may highlight an advantage in the AR state by allowing selected parts of a physical reality to shine through into VR. Users may be able to paint AR faces while in the AR state using a special passthrough material. This painting may not alter the cell's normal VR material(s) but rather, in some examples, causes the materials to be "overridden" with the passthrough material whenever the user is locked into the AR state with that AR cell. In various examples, while in the AR state or when passthrough is toggled on the quick paint menu may show the passthrough material as an option, to aid users in identifying the passthrough material as an option.

In various examples, new bindings may be created automatically as users perform certain operations in certain contexts. In some examples, a new binding may only be created in the VR state, otherwise the user may remain locked to the current AR cell and/or binding. A new binding may be created, for example, when the user paints with the passthrough material; when the user creates a cell while passthrough material is selected; when the user creates a cell and the passthrough toggle is on; when the user grip-navigates in "God Scale" and passthrough toggle is on; and, as discussed below, in additional or alternate circumstances. In various examples, the God Scale may be a user-definable scale. Accordingly, while in some examples the God Scale may represent an overhead perspective scale, for example, the user may be free to re-define the God Scale as desired.

Such "instant binding" may be used to bind to AR at existing virtual locations in a model, for example, inside an existing slab (that is, a shell without vertical sides) or shell. The anchor binding may be made such that the user's current virtual position and/or orientation in the virtual world and/or soon-to-be AR cell matches the position and/or orientation in the real world. Hence, by carefully choosing where the user stands in the real world as well as the user's virtual viewpoint in the virtual world, the initial mapping may be optimized.

As a user moves around, the VR device may keep track of the distance to the closest spatial anchor. If that distance goes beyond a certain distance threshold (for example, two to three meters), a new spatial anchor may be created by the system controller 102. As a user enters and moves about an AR cell, the VR device may use the closest spatial anchor(s) to continuously calibrate the mapping between the AR cell space (and, thus, the model space) and physical space, thereby ensuring a good match between the two.

In some examples, an alignment state may be a subset of the AR state, which may be only entered from the AR state or when locked into a binding. A user may enter this state to manually adjust the alignment of the current binding to the current physical space. Alignment state may additionally or alternatively be entered automatically in some cases, such as when the modeling system 100 detects that a realignment is needed.

In various examples of the alignment state, panning and rotating may become enabled again but, in addition to moving the user's model viewpoint the AR cell's binding may be updated so that the user retains the same physical space viewpoint as before. This may be the same as normal navigation from the user's perspective except that the user may see the virtual world move with respect to passthrough reality. The motion may be dampened from the ordinary virtual locomotion in some cases when the user is making proportionally smaller adjustments. In some examples, the alignment state may render passthrough cells visible as white-cage outlines. This may assist a user to realign a space where, for example, so much of the space is painted with non-passthrough materials that reality is barely or not at all visible.

In various examples, the modeling system 100 may assist users after losing virtual boundaries and/or spatial anchors. In various examples, the modeling system 100 may store all physical IDs indefinitely (for example, in storage and/or memory accessible to the system controller 102). When a user enters an AR cell linked to a physical ID that once existed on the local device but its spatial anchors are no longer accessible, then a new first "origin" spatial anchor may be created (for example, for that physical space ID, instead of a new one) and the alignment state may be automatically initiated. Although the alignment may feel the same to the user as before, an offset and/or correction to the physical space's origin anchor may be adjusted rather than the particular binding to the current AR cell. In some examples, such re-alignment may fix all AR cells and models linked to the refreshed physical space ID which may be more convenient than requesting that the user manually realign every model bound to that space.

In various examples, the modeling system 100 may use the known properties of model tables (which, for example, may have a fixed centroid that can only be resized symmetrically without skewing) to calculate a default binding for each physical space that can be used for models that do not have an explicit binding to the space. This default binding may be activated when the modeling system 100 wakes up in God Scale and discovers itself in a known space to which the current model has no God Scale binding. This may ensure that a previously open model will be aligned in a roughly sensible location, for example, on a physical table in the space that had been previously mapped. The user may be able to enter alignment mode and adjust the binding as usual, which may lead to a new binding being created in the model that overrides the default one. Accordingly, in various examples, it may not be necessary for every model that is intended to be viewed in a God Scale to be individually aligned to the current physical space.

In various examples, a default binding could, for example, comprise an anchor GUID, a binding pose and/or user scale, and the two horizontal dimensions of a virtual tabletop of the model from which the default binding was taken. To adjust the binding to a different model, the modeling system 100 could adjust the position of the pose towards and/or away from the tabletop and/or choose a user scale such that the new model's tabletop matches the binding tabletop's physical space position as closely as possible.

Examples of the disclosure support various use cases including for example, providing a prominent, easy way to readily create a new binding and begin to model in the AR state and mix realities; aiding users to set up walls that match their physical walls to make it possible to add and/or start geometry from the walls, get correct obscuring, allow VR painting of the walls and to enable "magic portals" into VR worlds while enabling the user to also get a matching floor and ceiling with a real thickness to allow painting and portaling of the floor and/or ceiling; in the case where scene API walls exist, importing these automatically, along with furniture and so forth, where the imported walls may be editable wall cells; supporting functionality that, once the walls have been created (for example, drawn and/or imported and/or edited to perfection), the user never has to repeat these operations for the current physical space, and the next time the user "instantiates" the current physical space and/or binds to it, those carefully designed walls and furniture should simply be there; and enabling a user to AR-bind and align existing places in a model (for example, a room or rooftop) including walls or furniture defined for the current physical space.

In various examples, passthrough walls and spatial API data may be exposed as components to the remainder of the modeling system 100. For example, a quick menu may have a "This Room" component that has the walls and the environment of the current physical space, if the physical space has been defined. The modeling system 100 may in fact have a set of such room components, one for each physical space the user has mapped out (for example, all of these might be available in a component panel). Any number of room component instances may be placed like normal components. In some examples, a "magic component" may be provided which represents the current spatial-map scene of the modeling system 100, if it exists.

In various examples, multiple methods of entering into mixed-reality modeling may be supported. In a first example, a user can toggle on passthrough at any time, in any scale at any location in the virtual model via a passthrough button on a user-input device. If the user creates a new cell then this may automatically create a new AR binding at the user's current location. Upon toggling off passthrough the user will remain in AR state, since the user is still locked into the new AR binding. The prominent display of the passthrough material on the quick menu may encourage users to discover how passthrough cells work.

In another example, a user may make a copy of and/or map out a physical location. A prominent template button may be provided on a start panel labeled, for example, "create your room." This may instantiate a template model with a modestly sized table and a passthrough-colored slab of some default size (for example, 10×10 meters). If the user has not yet drawn an environment then the modeling system 100 may run a scene API "define your walls" program. The VR device then creates passthrough-colored wall cells corresponding to the scene API objects as well as cells for furniture and window objects. A binding is created at the same time and the user ends up in AR mode, ready to paint, add cells, and create magic portals in the virtual environment. In another example, a user may place a copy of a room. Placing a "copy" of the current physical space may include placing the room component.

The VR environment may have a simple UI including, for example, a bracelet button that turns passthrough paint on and off on the sky and, in human-scale, on the tabletop 602. For example, the simulated hands shown holding the virtual controller 704 may include a virtual bracelet 706 having various buttons that can be toggled by the user. Whenever the user is in the AR mode, a lock button may appear on the bracelet 706, showing a closed-lock icon. Pressing the button toggles the icon to an open-lock state and frees the navigation controls so a user can move around using grip navigation. In various examples, the binding bode may not be updated unless the user toggles the lock button back to a closed-lock state while still inside the binding's sphere of influence. If the user instead teleports or otherwise exits the binding (for example, pans or scales out of it) then the alignment mode may terminate with no change made to the binding.

God-Scale bindings and human-scale bindings may have different requirements. For example, being out of alignment is generally uncomfortable in human scale since passthrough imagery on cells built to align with reality may not match anymore. Accordingly, one reason to enter alignment mode in human scale may be to establish a missing alignment or repair an existing one. Conversely, in God Scale, the alignment mode may not suffer this problem as the passthrough may only be visible on the skybox background which may be perceived to be far away. Even as a user grip-navigates around the table, the passthrough background remains static. This may cause the user's brain to interpret the motion as the table moving instead of the user. Therefore, discomfort may be minimized or non-existent. In various examples, doing God-Scale work in AR is in some respects nicer than in VR since the user is not bound to his/her surroundings.

For these reasons, God-Scale bindings may default to being in an unlocked alignment state while human-scale bindings may default to an AR state and/or locked mode. In some examples, a user may be able to lock back into a God-Scale binding by using the lock button on the bracelet 706 to keep the table at its current fixed physical location. In some examples, to implement this functionality the binding node may include an enum field "alignment" having one of various values such as: "none," indicating that a user enters and leaves the AR and/or alignment state with no persistent memory in the binding of these transitions, which may never transition into "locked" or "unlocked"; "locked," as discussed below; and "unlocked," indicating that a user enters the binding in the alignment state and can freely grip-navigate, where the binding is updated when the user exits (for example, by teleporting to human scale) even if the lock button is not toggled back to closed. If, however, the user does toggle the lock button to closed, then the alignment field may be set to "locked" as the user is locked back into the binding. The "locked" state, may be similar to the "none" field, except that if the user toggles the lock button to open then the alignment field may be set to the "unlocked" state to persistently remember this state. Human-scale bindings may be created with the alignment set to "none" while God-Scale bindings may be created with the alignment set to "unlocked."

In some examples, a model may only have a single God-Scale binding. In various examples, there may be two types of bindings including, for example, 1:1 human scale and non-human-scale bindings, such as God-Scale bindings. In various examples while in God-Scale alignment state, grip-scaling may update the scale of the God-Scale binding, such that the scale of that binding may vary, that is, it may not be at some fixed value. In various examples, teleporting up may engage the God-Scale binding, if present. If the binding's alignment field is locked then the user may lock into it as normal. If it is unlocked then teleporting up uses normal logic of going back to the last God-Scale pose, as in VR state. Teleporting around in human scale may lock into any human-scale bindings encountered.

In some examples, the VR device may enable users to grip-scale into and out of bindings. For human-scale bindings, the user may lock in as soon as the scales and location match well enough. The user may exit in the same manner, that is, by making a sufficiently large grip-scale operation to exit the binding. In other examples, a timing-based approach may be implemented. In some examples, God-Scale bindings may be in a permanent unlocked alignment mode and so may be re-scaled at will without an exit ever occurring. Furthermore, in some examples even if a God-Scale unlocked AR binding exists, a user might still wish to go to a large-scale viewpoint in the VR state. Accordingly, in various examples the God-Scale alignment and/or unlocked mode may only be transitioned in and/or out of using teleport up and/or down, that is, rather than being able to grip-scale into or out of the unlocked God Scale. In some examples, a user may still be able to grip-scale into and/or out of the AR state and/or locked God Scale.

In some examples, the VR device may store the latest state of the passthrough toggle in God Scale and reset it to that last value upon re-entering the God-Scale binding. In some examples, the passthrough toggle is otherwise unrelated to spatial anchors and AR bindings, and the effect of the toggle may be to toggle the passthrough on the sky (and, in human-scale, on the table).

In various examples, the modeling system 100 may upload anchors (that is, some suitably encoded set of images) to other VR devices (for example, via a cloud infrastructure). Shared spatial anchors may enable automatic binding and alignment of co-located meeting devices, such that if one device is bound to the space then all of the devices can automatically align, and may enable all users to know which users are co-located together. That is, users may be partitioned into co-location groups (that is, a group of users sharing a physical location) having a count from one to the number of users in a meeting session.

Figure 9:
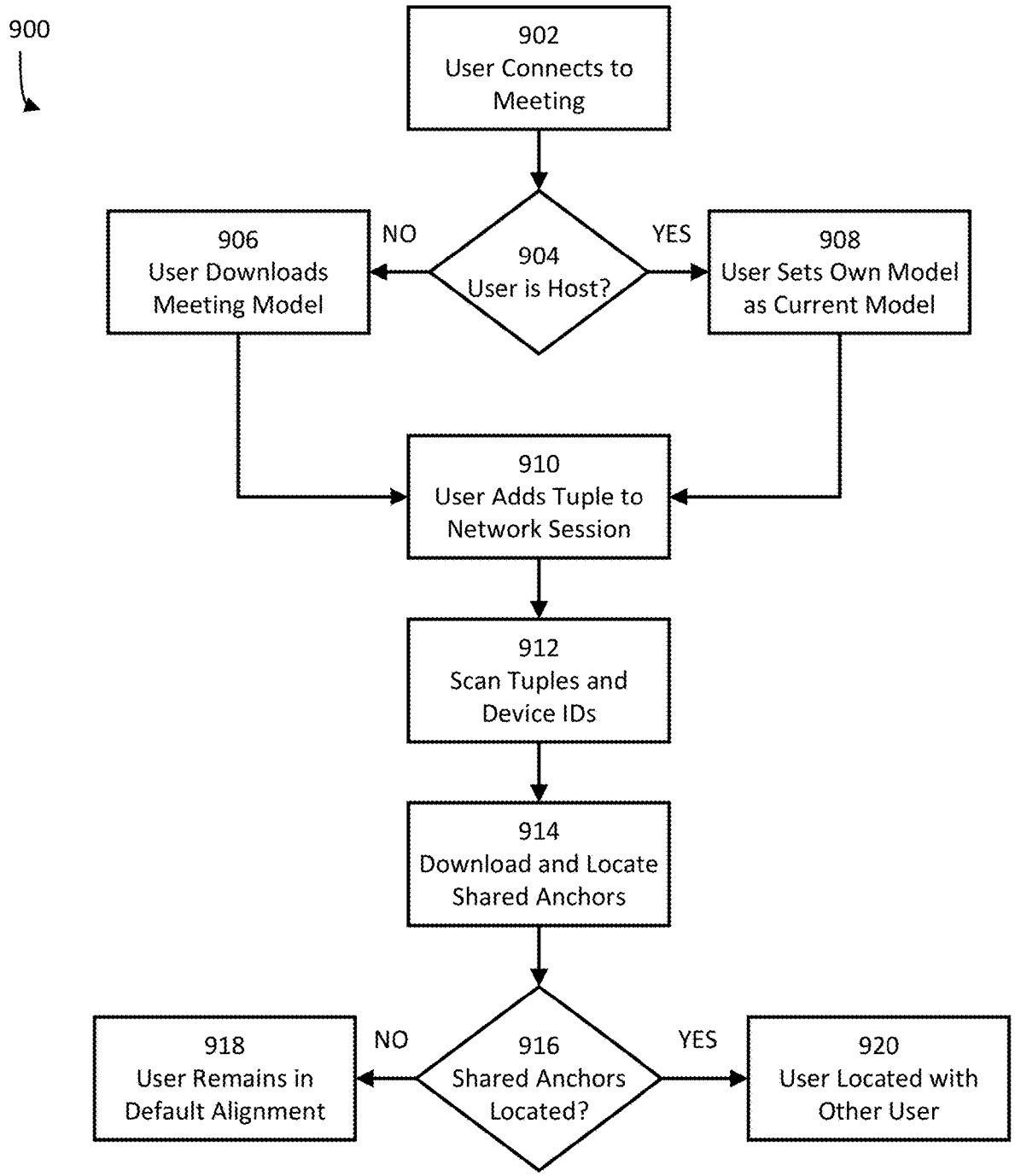
FIG. 9 illustrates a process of enabling multiple users to interact in a simulated environment according to an example.

FIG. 9 illustrates a process 900 of enabling multiple users to interact in a simulated environment according to an example. At act 902, a user U may connect to a meeting of multiple users in a current physical space. If the user U is not the host of the meeting (904 NO), then at act 906, the user U enters the meeting and may download the meeting model M. If the user U is the host of the meeting (904 YES), then at act 908, the user U may set its own model M as the current meeting model (for example, if the user U is the host).

If the origin anchor of the user Us current physical space has not been uploaded during the current session then the uploading may be initiated asynchronously like similar spatial anchor API interactions. Once the upload completes, the resulting shared anchor GUID (which may or may not be the same as the spatial anchor's own GUID) AnchorID is associated with PSID, the current physical space ID, for at least the duration of that session. In various examples, therefore, a VR device may store all spatial anchors that it has uploaded and downloaded in a session so these operations are no-ops when anchor IDs are already in the session cache.

At act 910, if the user U has a binding for the model M to PSID, then the user U may add the tuple (AnchorID, PSID) to its network session data available to all session users. This announces that the shared anchor AnchorID is the origin anchor for the user's unique, local physical space PSID. The pose and scale of the PSID/M binding may be gleaned from the corresponding physical space binding attribute node in the model M. In various examples, even if the user U only has a default binding for PSID/M (for example, giving a reasonable alignment of the model M in the user Us physical space) then that default anchor may be converted into a real anchor and binding in the model M and subsequently uploaded.

At act 912, the user U may then scan all the (AnchorID, PSID) tuples and device IDs of all the other users in the meeting. If the user U uploaded a shared AnchorID, then the user U may share that anchor with all the other meeting users and/or device IDs via the API. In some examples, the user U scans the meeting user data immediately upon connecting and only adds its AnchorID/PID tuple once the sharing of AnchorID is complete, to ensure other users are able to download it. As a new user N (possessing a device ID) enters the meeting then, in some examples, the user U may immediately share AnchorID with the new user N, to maintain the invariant that all meeting users can download all shared anchors in the meeting. In various examples, the PSID of each such tuple found there will be a binding attribute node in the model M with that PSID, making a 1:1:1 association between the tuple's user ID, PSID and AnchorID.

At act 914, the user U may then download at least a subset of the shared anchors of the meeting, to learn which users the user U is co-located with. Once the anchors have been downloaded, the user U may attempt to locate the anchors using the spatial anchors API, to see if any of the anchors match the user Us physical location. For the first shared anchor S that can be located thus (or, in some examples, the best shared anchor or the average of multiple spatial anchors), the user U computes the relative transform between the anchor S and the user Us AnchorID and uses the transform to complete the binding of the model M to PSID, thereby bringing the user U into alignment such that, in some examples, the model M shows at the same physical location as it does for the user that created the anchor S. In various examples, the user U may only use the anchor S to complete a binding for its own local PSID to the model M. However, PSID may still have the local AnchorID as the origin anchor of PSID's anchor grid. The user U may lock into the new binding, which might require a teleport, in which the user U retains the same physical position but the table will seem to jump to its correct location. The next time the user U loads the model M in physical space PSID, the user U may immediately lock into the binding with no recourse to the shared anchors API.

In various examples, if the user U cannot locate any of the shared anchors (916 NO), then at act 918 the user U remains in whatever default alignment the user U had. Conversely, if the user U does locate a shared anchor S created by a user X (916 YES), then at act 920 the user U may also know it is co-located with the user X, that is, that the user U and the user X are in the same co-location group. In various examples, the user U knows that it's in a co-location group with all the users whose shared anchors the user U can locate.

In various examples, for each co-location group G in the meeting, the VR device may hide the avatars of each user in the co-location group G when both the user U and the user X are in the God-Scale passthrough (for example, since there will be a real person in the physical space behind the user's avatar), and may only send the voice of the user U to users that are not in the co-location group G. For example, the user U should not be able to hear the audio of users in the co-location group G since the audio would be an echo of the voices heard in reality.

In various examples, an "interest group" mechanism may be provided to address such cases. In various examples, users may be able to send their voice data to a particular interest group (for example, identified by number ranging from 1 to 255) and a user may only receive data from those interest groups that the user subscribes to. Hence, it may be advantageous to enable clients to map co-location groups to interest groups. For example, the meeting clients may benefit from a commonly held, relatively stable mapping from the co-location groups in a meeting (which may vary dynamically) to a set of integers in 1 to 255.

In various examples, the VR device may support a peer-to-peer architecture without a central server to manage groups. In some examples, the VR device may use a shared, deterministic protocol for clients to perform the mapping. For example, if B denotes the list of the m bindings in the model's space bindings sorted by physical space IDs, B may be used to associate the integers and/or group IDs 1 to m one-to-one with the PSIDs at those indices in B. For each group of co-located users, the lowest PSID of any user in that group may serve as the Sentinel ID for that group, yielding the interest group integer ID for the group. In various examples, each user may have at least one binding entry in the node. In various examples, B is relatively stable at least because it only changes when a new user binds M for the first time which may be an infrequent event. Even when it changes, all clients in a meeting may simply re-run this group-ID assignment algorithm locally and begin transmitting and receiving on the new set of group ID channels, with minimal disruption.

Examples of the disclosure enable each user to know which users and/or PSIDs are grouped together. This may be achieved by letting each user have, in addition to its (AnchorID, PSID) user property tuple, the PSID of one of its co-located users termed as the user's group space ID (GSID). As the user U succeeds in locating a shared spatial anchor S from the property tuple (S, P) of some other (for example, earlier) user X, the user U "joins the group" by setting P as its GSID. Accordingly, the user U may thereby assert that the user U is in the same co-location group as the user owning the physical space ID P, that is, user X. By following the GSID references of all meeting users, the users' co-location grouping can be established and the group's lowest space ID identified as the group's sentinel ID. This in turn may map to the co-location group's interest group ID. As an optimization, users that are in a group by themselves may simply use the global interest group 0, since there's no need to separate their voice channels and not doing so may save resources.

Accordingly, in various examples, a user needs only download one spatial anchor from each pre-existing co-location group as it may not be necessary to download multiple shared anchors for the same physical location. Further, in various examples known Physical Space ID associations may be stored permanently in the physical space database of the modeling system 100 (for example, knowing that PSIDs A and B represent the same physical location) since this information can be used in the next meeting to partition users immediately without waiting for shared spatial anchors to be shared and located. In some examples, if all users in a meeting (that is, the physical locations containing those users) have met before then it may not be necessary to use spatial anchors at all, because users could be assigned to co-location groups right away. The spatial anchor uploading does, however, enable one or more new users and/or users joining from new locations for the first time to be accommodated (for example, because of lost spatial anchors).

However, in various examples downloading and locating shared anchors may be fairly rare. For example, the modeling system 100 may only need to do so when loading a model M for the first time in a new and/or unknown physical location. Conversely, if the modeling system 100 has previously loaded any model in the physical location, the modeling system 100 may be able to determine a default binding.

In various examples, co-location functionality may be supported without implementing shared anchors. For example, rather than VR devices automatically detecting that the devices are co-located, users may manually input an indication of the devices' co-location. In one example, a user may point at another user's avatar in a simulated environment (or, for example, another user's username in a meeting panel), and select a user-interface element indicating that the user is co-located with the other user. The VR device may responsively set the selected user's PSID as the local user's GSID, thereby binding together the two space IDs and enabling the local user to join the selected co-location group. In various examples, the absence of shared spatial anchors may result in users manually aligning each physical space for each period that the user's device maintains its spatial anchors.

Accordingly, examples of the disclosure enable virtual and physical worlds to be aligned for virtual objects, walls, and furniture to retain their desired position. Using spatial anchors, examples of the disclosure lock virtual scenes in place responsive to a user activating passthrough modeling (for example, by toggling a passthrough mode in a user-input device and/or by placing a virtual object in a room). Spatial anchors may persist on a VR device and/or in each scene that is tied or locked to the physical space. Accordingly, whenever the scene is viewed in the same physical space, the virtual objects may be automatically aligned to their prior locations in the space.

Moreover, as discussed above, users may be able to import physical rooms to the modeling system 100 to immediately begin modifying the imported room. When a room is imported, the modeling system 100 may create a new scene, lock the room in position using spatial anchors, and teleport the user into the room at human scale. The modeling system 100 may create a floor, ceiling, and walls that can be modified by users. For example, the assets may be painted with a passthrough material so that users may see their physical environment through the asset surfaces. This enables users to apply different materials to walls, add virtual objects to the room, create a virtual window in a wall, and so forth.

Examples of the disclosure also provide locking at different scales. For example, while working on a design (for example, a room in a house), a user may be operating at a human scale to experience a design as a human might. The user may change between the human-scale view and a large-scale view (or "bird's-eye view") in which the user may be looking down at the design on a worktable, such as the virtual tabletop 702. At this large scale, the user may be able to lock the worktable in a physical position in the environment, or may toggle the passthrough mode to pan, rotate, and/or scale the worktable, then re-lock the worktable in place. Accordingly, the worktable position may be repositioned at will by toggling the lock button off or by aggressively panning, rotating, and/or scaling the worktable using the grip buttons and/or hand gestures. Similar principles may apply at the human scale.

In various examples, the modeling system 100 may lock the user into position when working at the human scale in certain cases, such as if the user imports a new room into the program being executed by the modeling system 100, if the user has passthrough enabled and creates geometry on top of the real world, if the user creates or paints geometry using the passthrough material, and so forth. In these cases, a user may expect that the virtual and real worlds remain aligned when moving around, since parts of the real world are visible to the user. Accordingly, examples of the disclosure auto-align to a locked position when the modeling system 100 wakes up or when the user walks between virtual boundaries.

While in the locked position, a user may wish to make adjustments to better align the virtual and physical scenes. In one example, this may be achieved by toggling the lock button off, making any desired alignment adjustments, and toggling the lock button on. In some examples, the alignment may be adjusted in only one capacity (for example, by only panning, only rotating, and/or only scaling) by the user providing more-aggressive inputs for the desired adjustment. For example, if a user can pan a scene by moving a user-input device horizontally, the user may pan the scene without rotating or scaling by aggressively moving the user-input device horizontally.

In some examples, a user may wish to move around a virtual scene without moving in the physical world. A user in a locked position may teleport away from the user's current position to exit the lock. Once the user has exited the locked position, the modeling system 100 may show a location marker in the virtual scene indicating where the user is located in reality, even if the user has moved virtually. The user may be able to snap back to the locked position by teleporting to the location marker, thereby re-aligning the real and virtual worlds.

As discussed above, VR devices discussed herein may support virtual-boundary systems (or guardian systems) to prevent a user from leaving a certain designated physical space. Whereas the designated physical space may be free of physical obstacles, and thus convenient for the user to move around in, areas outside of the designated physical space may have physical obstacles such as furniture and walls. A virtual boundary thus aids a user in avoiding contact with these physical obstacles.

In various examples, different systems may be implemented to aid a user in avoiding physical obstacles in addition to, or in lieu of, virtual-boundary systems. For example, a passthrough feed may be selectively provided to the user based at least in part on passthrough criteria being met. Passthrough criteria may include criteria which, when met, result in a passthrough feed being at least partially displayed to the user. For example, passthrough criteria may include the position and/or speed of the user. In some examples, the passthrough feed may be displayed to the user any time the user moves from a stationary position. In other examples, the passthrough feed may be displayed to the user any time the speed, distance traveled from a starting location, or both, exceed a threshold amount. For example, a passthrough feed may not be shown to the user if the user is moving slower than 0.5 meters per second, but may be displayed to the user if the user is moving faster than 0.5 meters per second.

In another example, a passthrough feed may not be shown to the user if the user has not traveled more than one meter from a starting location, but may be shown to the user if the user has traveled more than one meter from the starting location. In other examples, other threshold values (including values of zero) may be implemented. A starting location may refer to a location that the user was most recently stationary at before beginning to move. A starting location may be re-defined each time the user moves. For example, if a user moves two meters from a first location and then stops at a second location, the second location may be a new starting location. While the user moves from the second location to a third location, the second location may be considered the starting location until the user stops at the third location, at which point the third location becomes the new starting location.

Figure 10:
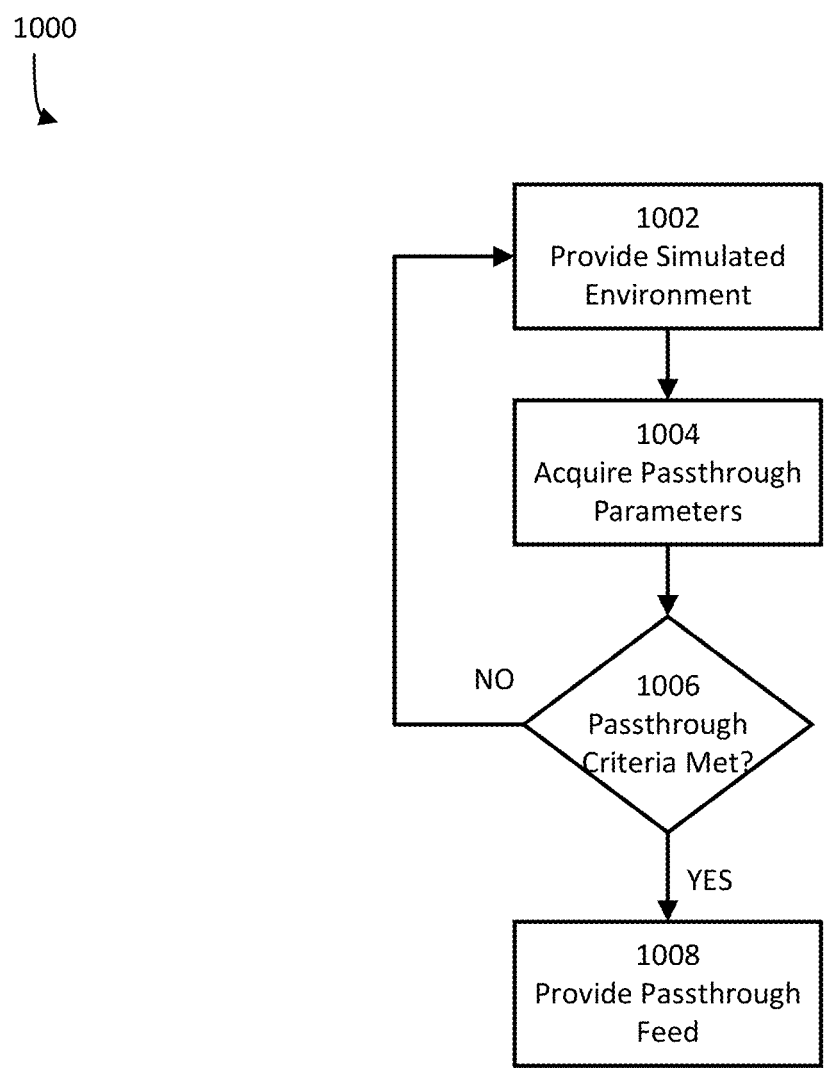
FIG. 10 illustrates a process of providing a passthrough feed to a user according to an example.

FIG. 10 illustrates a process 1000 of providing a passthrough feed to a user according to an example. The process 1000 may be executed by the modeling system 100.

At act 1002, the modeling system 100 provides a simulated environment to a user. The simulated environment may be a VR, AR, or MR environment. The simulated environment may be provided to the user via the display 104.

At act 1004, the modeling system 100 monitors passthrough-criteria parameters. Passthrough-criteria parameters may include parameters which are compared to passthrough criteria to determine whether to display a passthrough feed to a user. For example, passthrough parameters may include a speed of the user and/or a position of the user. Passthrough-criteria parameters may be acquired at least in part by the sensors 202. For example, the sensors 202 may include one or more accelerometers to determine a speed and/or position of the display 104 and, in turn, the user.

At act 1006, the modeling system 100 determines whether one or more passthrough criteria have been satisfied by the passthrough parameters. As discussed above, passthrough criteria may include, for example, a minimum speed threshold being exceeded or a minimum distance threshold from a starting position being exceeded. Passthrough criteria may depend at least in part on a type of simulated environment provided to a user. For example, a passthrough feed may be provided more readily to a user in a VR environment than in an AR environment, and the passthrough criteria for a VR environment may therefore be less strict (for example, by having lower minimum speed criteria).

If the passthrough criteria have not been met (1006 NO), then the process 1000 returns to act 1002. If the passthrough criteria have been met (1006 YES), then the process 1000 continues to act 1008.

At act 1008, the modeling system 100 provides a passthrough feed to a user. When a passthrough feed is provided to the user, the passthrough feed may be at least partially overlaid with the simulated environment displayed to the user. In some examples, when the modeling system 100 displays the passthrough feed, the modeling system 100 only displays the passthrough feed; that is, the modeling system 100 stops displaying any simulated environment to the user, and only displays the passthrough feed. In other examples, the modeling system 100 overlays the passthrough feed on the simulated environment or overlays the simulated environment on the passthrough feed and blends the two together such that both are visible.

Blending the passthrough feed with the simulated environment (for example, overlaying one on the other) may include selecting an opacity of the passthrough feed compared to the simulated environment. For example, if the passthrough feed is displayed at a higher opacity (for example, more than 50%) than the simulated environment, the user may predominantly see the passthrough feed while faintly seeing the simulated environment. If the passthrough feed is displayed at a lower opacity (for example, less than 50%) than the simulated environment, the user may predominantly see the simulated environment while faintly seeing the passthrough feed. Increasing the opacity of the passthrough feed may allow the user to see more of the physical world; accordingly, the opacity of the passthrough feed may be increased when it is more important for the user to see the physical world, such as if the user is moving quickly or straying farther from a starting location, because the user may wish to easily see physical obstacles to avoid.

In some examples, the passthrough feed may be blended with the simulated environment at a fixed opacity, such as 25%, 50%, 70%, and so forth. In other examples, the opacity may be selected based on one or more parameters, such as the speed at which the user is moving and/or the position of the user. For example, as the distance and/or speed of the user increases, the passthrough feed may be displayed at a higher opacity in pursuant to a stepwise function, a linear function, a logarithmic function, or another approach. That is, if the user is running, the passthrough feed may be displayed at a higher opacity than if the user were walking in some examples. The opacity response for one parameter, such as speed, may differ from the opacity response of another parameter, such as distance. For example, the opacity may only be increased to as much as 50% in response to a far distance being traveled, but may be increased to 90% in response to the user moving at a high speed.

In some examples, the opacity of the passthrough feed may depend at least in part on a mode of operation of the modeling system 100, such as a VR mode, AR mode, or MR mode. In a fully immersive VR mode, the user may typically only see computer-generated stimuli without seeing any stimuli in the physical world. Conversely, in the MR mode, the user may see a combination of physical and computer-generated stimuli. The user may have a more limited understanding of his or her position in the physical world in the VR mode, because the user is typically only seeing computer-generated stimuli. Conversely, the user may have a more expansive understanding of position in the physical world in the MR mode, because the user is exposed to at least some physical stimuli. Accordingly, the user may be more likely to inadvertently collide with physical obstacles while in the VR mode than in the MR mode. Generally speaking, therefore, the opacity of the passthrough feed may be higher in the VR mode than in the MR mode, although in other examples this may not be the case.

In some examples, therefore, the passthrough feed may be displayed at a higher opacity in the VR mode than in the MR mode. Furthermore, if thresholds are implemented above which the passthrough feed will be displayed, the thresholds may be lower for the VR mode such that the passthrough feed is displayed more often in the VR mode. The passthrough feed may be displayed more readily, and at a higher opacity, in the VR mode than in the MR mode because the user may be less aware of the physical world while in the VR mode. Accordingly, the user may benefit more from the passthrough feed while in the VR mode than in the MR mode in some examples. The process 1000 then returns to act 1002.

Examples will be provided for purposes of illustration. In a first example, the modeling system 100 is operating in a VR mode and displays a passthrough feed at a fixed 50% opacity whenever a user is moving faster than one meter per second. As long as the user is moving slower than one meter per second, the display 104 will display only the simulated environment without the passthrough feed. If the user moves more quickly than one meter per second, the display 104 will overlay the passthrough feed on the simulated environment at 50% opacity.

In a second example, conditions are identical to the first example except that the modeling system 100 will also display the passthrough feed if the user moves more than two meters from a starting location. As long as the user is moving slower than one meter per second and stays within two meters of the starting location, the display 104 will display only the simulated environment without the passthrough feed. If the user moves more quickly than one meter per second or moves more than two meters from the starting location, the display 104 will overlay the passthrough feed on the simulated environment at 50% opacity. Each time the user stops after moving, the position that the user stops at may be set as the new starting location. Accordingly, if the user moves more than two meters from the starting location, the passthrough feed may be displayed at 50% opacity regardless of the speed of the user.

In a third example, conditions are identical to the second example except that the relationship between opacity and speed differs from the relationship between opacity and distance. For example, the relationship between opacity and distance may be that the passthrough feed is displayed with 30% opacity whenever the user travels more than two meters from the starting location. The relationship between opacity and speed may be that the passthrough feed is displayed with an opacity that increases linearly with speed. For example, at speeds below 0.5 meters per second, the passthrough feed may not be displayed based on speed (but may be displayed based on distance). At speeds above 0.5 meters per second, the opacity of the passthrough feed may increase linearly from 30% to 80% as the user's speed increases from 0.5 meters per second to 3 meters per second and above. That is, between 0.5 and 3 meters per second, the opacity may increase linearly from 30% to 80%, and at speeds above 3 meters per second, the opacity may be set to 80%.

In a fourth example, conditions are identical to the third example except that the modeling system 100 is in an MR mode rather than a VR mode. In general, opacity values may be lower in the MR mode than the VR mode because, in the MR mode, certain stimuli from the physical world are already displayed to the user. Accordingly, the relationship between opacity and distance in the MR mode of the fourth example may be that the passthrough feed is displayed with 20% opacity (rather than 30% opacity) whenever the user travels more than two meters from the starting location. The relationship between opacity and speed in the MR mode of the fourth example may be that the passthrough feed is displayed at 20-60% opacity (rather than 30-80% opacity) as the user's speed increases from 0.5 to 3 meters per second.

Accordingly, the modeling system 100 may be configured to overlay a passthrough feed on a simulated display. The opacity or intensity of the passthrough feed may depend at least in part on parameters such as speed and distance of the user, the mode of operation of the modeling system 100, and so forth. The modeling system 100 may continually monitor relevant parameters and may continuously blend the passthrough feed with the simulated environment as appropriate. It is appreciated that examples provided above are intended to be illustrative rather than limiting, and that other examples are within the scope of the disclosure.

In various examples, aspects of the disclosure may be stored in storage and/or memory and may be executed by one or more controllers. In some examples, one or more computer-readable media may store instructions that, when executed by at least one controller and/or processor, cause the controller and/or processor to execute the various operations discussed above. In some examples, the instructions may be stored on one or more computer-readable media internal to a VR device, although the instructions may be provided separately from the VR device.

In some examples, at least one controller (the "controller") may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A non-transitory computer-readable medium storing thereon sequences of computer-executable instructions for providing a simulated environment, the sequences of computer-executable instructions including instructions that instruct at least one processor to:
   display, at a human-scale point-of-view, at least a first portion of a simulated environment to a user in a first location;
   receive, from the user, one or more user inputs to transition to a large-scale point-of-view;
   store, responsive to receiving the one or more user inputs, a position and orientation of the user at the first location;
   display, at the large-scale point-of-view responsive to receiving the one or more user inputs, at least a second portion of the simulated environment to the user;
   receive, from the user, at least one user input to transition back to the human-scale point-of-view;
   display, at the human-scale point-of-view responsive to receiving the at least one user input, the at least the first portion of the simulated environment to the user at the first location;
   lock the position and orientation of the user at the first location responsive to displaying the at least the first portion of the simulated environment to the user at the first location responsive to receiving the at least one user input;
   generate, for a physical space, at least one anchor grid including one or more spatial anchors; and
   add, as the user moves around the physical space, additional spatial anchors to the at least one anchor grid.

2. The non-transitory computer-readable medium of claim 1, wherein the instructions further instruct the at least one processor to:
   display a passthrough feed of a physical environment to the user responsive to one or more passthrough criteria being met.

3. The non-transitory computer-readable medium of claim 2, wherein the one or more passthrough criteria include a speed of the user exceeding a threshold speed.

4. The non-transitory computer-readable medium of claim 2, wherein the one or more passthrough criteria include a distance between the user and a starting position being exceeded.

5. The non-transitory computer-readable medium of claim 4, wherein the starting position is a position at which the user was most recently stationary.

6. The non-transitory computer-readable medium of claim 4, wherein the one or more passthrough criteria further include a speed of the user exceeding a threshold speed.

7. The non-transitory computer-readable medium of claim 1, wherein storing the position and the orientation of the user at the first location includes storing an indication of the position and the orientation of the user relative to at least one spatial anchor closest to the first location.

8. The non-transitory computer-readable medium of claim 1, wherein the instructions further instruct the at least one processor to:
   define the one or more spatial anchors relative to the physical space, the one or more spatial anchors being independent of the simulated environment.

9. A method for providing a simulated environment, the method comprising:
   displaying, at a human-scale point-of-view, at least a first portion of a simulated environment to a user in a first location;
   receiving, from the user, one or more user inputs to transition to a large-scale point-of-view;
   storing, responsive to receiving the one or more user inputs, a position and orientation of the user at the first location;
   displaying, at the large-scale point-of-view responsive to receiving the one or more user inputs, at least a second portion of the simulated environment to the user;
   receiving, from the user, at least one user input to transition back to the human-scale point-of-view;
   displaying, at the human-scale point-of-view responsive to receiving the at least one user input, the at least the first portion of the simulated environment to the user at the first location;
   locking the position and orientation of the user at the first location responsive to displaying the at least the first portion of the simulated environment to the user at the first location responsive to receiving the at least one user input;
   generating, for a physical space, at least one anchor grid including one or more spatial anchors; and
   adding, as the user moves around the physical space, additional spatial anchors to the at least one anchor grid.

10. The method of claim 9, further comprising:
    displaying a passthrough feed of a physical environment to the user responsive to one or more passthrough criteria being met.

11. The method of claim 10, wherein the one or more passthrough criteria include a speed of the user exceeding a threshold speed.

12. The method of claim 10, wherein the one or more passthrough criteria include a distance between the user and a starting position being exceeded.

13. The method of claim 12, wherein the starting position is a position at which the user was most recently stationary.

14. The method of claim 12, wherein the one or more passthrough criteria further include a speed of the user exceeding a threshold speed.

15. The method of claim 9, wherein storing the position and the orientation of the user at the first location includes storing an indication of the position and the orientation of the user relative to at least one spatial anchor closest to the first location.

16. The method of claim 9, further comprising:
    defining the one or more spatial anchors relative to the physical space, the one or more spatial anchors being independent of the simulated environment.

17. A non-transitory computer-readable medium storing thereon sequences of computer-executable instructions for providing a simulated environment, the sequences of computer-executable instructions including instructions that instruct at least one processor to:
    display, at a human-scale point-of-view, at least a first portion of a simulated environment to a user in a first location;

receive, from the user, one or more user inputs to transition to a large-scale point-of-view;
store, responsive to receiving the one or more user inputs, a position and orientation of the user at the first location;
display, at the large-scale point-of-view responsive to receiving the one or more user inputs, at least a second portion of the simulated environment to the user;
receive, from the user, at least one user input to transition back to the human-scale point-of-view;
display, at the human-scale point-of-view responsive to receiving the at least one user input, the at least the first portion of the simulated environment to the user at the first location;
lock the position and orientation of the user at the first location responsive to displaying the at least the first portion of the simulated environment to the user at the first location responsive to receiving the at least one user input; and
display a passthrough feed of a physical environment to the user responsive to one or more passthrough criteria being met, the passthrough criteria including a distance between the user and a position at which the user was most recently stationary being exceeded.

* * * * *